FIG_6_

FIG_1_

INVENTOR.
JOHN T. COCHRAN
BY
Christie, Parker & Hale
ATTORNEYS.

United States Patent Office 3,329,130
Patented July 4, 1967

3,329,130
PRESSURE RECOVERY AXIAL FLOW
VAPOR-LIQUID SEPARATOR
John T. Cochran, San Jose, Calif., assignor to General Electric Company, New York, N.Y., a corporation of New York
Filed July 30, 1965, Ser. No. 476,051
16 Claims. (Cl. 122—34)

This invention relates to the separation of vapor from liquid, and particularly relates to a high performance axial flow, vapor-liquid separator, which is effectively applied in the separation of steam from boiling water. In this service, the separator is customarily referred to as a steam separator.

Steam is widely used in industrial practice as a fluid for heating and for the driving of prime movers such as steam engines, steam turbines and the like. In virtually all cases it is necessary that the steam be "dry," that is, free from entrained water in the liquid phase. This is particularly true when the steam drives a prime mover of the types mentioned since water accumulations of sufficient volume in a steam engine cylinder can destroy the cylinder, and the presence of excessive entrained water in the steam turbine erodes the turbine buckets and nozzles, leading to ultimate failure.

In conventional steam practice where a steam generator is fired by fossil fuels such as coal, oil, or gas, there is ordinarily no great need for steam separators of unusually small physical size which are capable of handling unusually high quantities of mixed steam and water. One example of this is the case of high performance boiler designs where a steam drum is connected to receive a mixture of boiling water and steam from heated tubes. The capacity of the steam drum to effect separation of the steam can be considerably increased by the incorporation in the drum of individual separators of the centrifugal type. These separators receive the steam-water mixture through the steam drum wall, deliver steam into the upper portion of the drum for removal to a load, and discharge the separated water to the lower portion of the drum for removal and revaporization. The capacity of the steam drum having such internal separators is readily and economically increased by increasing the length of the steam drum and the number of separators that it contains. Such a steam drum is shown in U.S. Patent No. 2,648,397.

Recent steam plant development has included the utilization of nuclear fission reactors as steam generators in which a self-sustaining chain nuclear fission reaction is maintained in the reactor core to liberate heat, the heat being transferred to a body of boiling water to effect steam generation. The design and operating principles of boiling water reactors are well known in the art, for example, they are described in Boiling Water Reactors by Andrew W. Kramer, Addison-Wesley Publishing Company, 1958, and elsewhere. The boiling water reactor functions primarily as a heat source and delivers a mixture of boiling water and steam which must be separated. In conventional low power density reactors, the steam has been separated by maintaining a free liquid surface somewhere in the reactor vessel above the core as described in the Proceedings of the International Conference on the Peaceful Uses of Atomic Energy, 1955, volume 3, page 56 et seq. and page 250 et seq. However, the volumetric rate at which steam can be separated in such a system is limited to a value equal to the cross-sectional area of the free liquid surface multiplied by the maximum superficial velocity at which steam can be removed from such a surface without excessive entrainment of unvaporized water. This maximum velocity varies with pressure and temperature of the system, and at 1000 p.s.i.a. and 546° F. for example, it is about one foot per second. Even so, steam separated in this manner contains about six percent by weight of entrained liquid water as "carryover," and it must be dried in a steam dryer to reduce the moisture content to less than about 0.1 weight percent for safe admission to a steam turbine. This 0.1 percent limit is lower than conventional practice because of the necessity for limiting radioactive buildup in the turbine.

Higher power density boiling water reactors require special steam separating equipment. For example, the 192 mw. e. (megawatt electrical) boiling water nuclear reactor at Dresden Station near Chicago is provided with a steam drum located approximately eighty-five feet above the top of the reactor pressure vessel. The drum is about eight feet in diameter, sixty-six feet long, and contains about 290 individual steam separators. The steam-water mixture from the reactor is introduced at a rate of about 26.5 million pounds per hour into the separators through a plurality of risers and a manifold. Separated water is returned from the drum to the reactor by downcomers at a rate of about twenty-five million pounds per hour. This elevated steam drum, the elongated risers, and downcomers require large amounts of piping, shielding, containment, insulation, supporting structure, and other materials which in this case is justified by the substantial increase in power output of the system relative to that of a conventional boiling water reactor system.

A substantial reduction in the materials required for such a boiling water reactor steam source could be achieved if steam separators of the same capacity could be removed from this elevated position and located within the reactor pressure vessel. However, if a boiling water reactor in a 160-inch inside diameter pressure vessel is provided with the best commercially available prior art steam separators, i.e., those with the highest steam separating capacity per unit volume and which are of the axial flow centrifugal type with mesh type preliminary dryers, the electrical power output is limited by the separator performance at a value of about two hundred mw. e. This is not much more than the power output of the Dresden Station, which has a somewhat smaller pressure vessel.

The vapor-liquid separator of this invention, which, when substituted for the conventional steam separators in the boiling water reactor referred to immediately above, permits the electric power output of the plant to be increased to at least three hundred mw. e.

This invention provides an improved high performance vapor-liquid separator for use, for example, in high performance boilers of any kind, including high power density boiling water reactors.

This invention also provides an improved centrifugal steam separator and preliminary dryer combination which is capable of receiving steam-water mixtures of from one to about fifteen percent quality, that is, mixtures containing one percent to fifteen percent weight of steam, and which is capable of separating such mixtures efficiently at substantially increased rates and delivering separated steam and water at low values of water carry-over and steam carry-under. Moreover, the steam separator achieves the increased capacity while operating at substantially reduced head losses.

These and other aspects of this invention will become apparent to those skilled in this particular art as the description and illustration proceed.

Briefly, one form of this invention is vapor-liquid separator which comprises an elongated vortex tube having a vapor-liquid mixture inlet opening at one end and an outlet opening at the other end. Means adjacent the inlet opening impart to a vapor-liquid mixture a rotary motion sufficient to establish within the vortex tube a vapor vortex surrounded by a coaxial liquid vortex. A first annular liquid removal means surrounds and is spaced from the outlet edge of the vortex tube to form therebetween a first annular liquid flow reversing outlet passage adapted to receive the liquid vortex at said outlet end and conduct it 180° around the end of said vortex tube.

In the preferred form of this invention, diffuser blades are disposed in the first annular liquid reversing outlet passage to reduce the velocity of the liquid and convert some of its kinetic energy to pressure head. To prevent flow separation or "flashing" of the liquid in the diffuser sections between adjacent diffuser blades, it is preferable to impose a back pressure on the liquid discharged from the diffuser blades. In one form, back pressure is imposed by reducing the cross-sectional area of the first annular liquid removal means downstream from the diffuser vanes. Alternatively, the flow from the diffuser vanes is discharged into a separate plenum connected to the suction side of recirculation pumps used in the installation served by the separator, thereby reducing the pumping power requirements.

In the preferred form, a second annular liquid removal means surrounds and is spaced from the first annular means to form therebetween a second annular liquid flow reversing outlet passage to receive boundary layer liquid spillage from the entrance to said first annular means and further adapted to conduct said spillage through 180° around the first annular means. The second annular means has a central opening through which the vapor vortex discharges from said vortex tube.

In another preferred form of the invention, vanes are disposed in the second annular liquid removal means which receives a boundary layer mixture of vapor and liquid. The vanes impart a spinning motion to the vapor-liquid mixture to generate a vortex in the second annular liquid removal means, thereby separating liquid from vapor. Preferably, the second annular liquid removal means opens at its outlet end at a level below the liquid level in the vessel served by the separator. Vapor passages are provided from the second annular liquid removal means to permit vapor to flow from the second annular liquid outlet passage and join vapor which passes directly through the opening in the second annular means.

An additional aspect of this invention comprises a preliminary dryer adapted to be connected in vapor-receiving relation to the separator defined above, or with other separators, which dryer comprises a dryer housing having an inlet opening centrally located at one end and a dried vapor outlet opening centrally located at the other end, a cylindrical layer of fluid-permeable contact material disposed on the inner wall of the housing, a conical layer of fluid-permeable contact material disposed apex downward within and spaced apart from the cylindrical layer and secured at its upper edge to the upper edge of said outer housing, and means for removing from each of said fluid-permeable layers liquid accumulated therein from said vapor.

These and other aspects of the invention will be fully understood from the following description and the accompanying drawings, all of which are described as applied to the separation of steam and water, in which:

FIG. 5 is a view taken on line 5—5 of FIG. 2A showing the diffuser blades in the first annulus.

Figure 1:
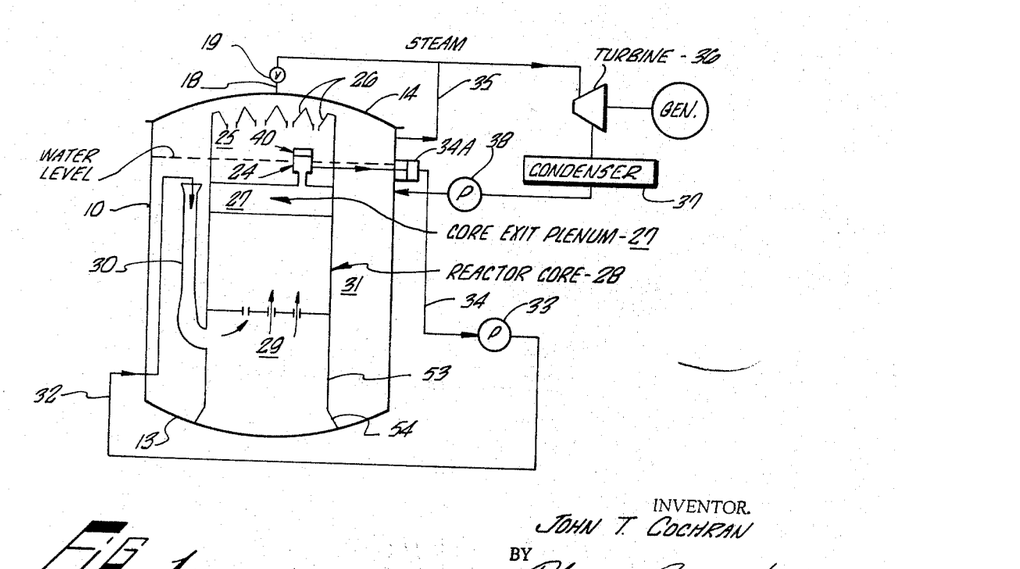
FIG. 1 is a schematic elevation of steam separators of this invention mounted in a boiling water nuclear reactor.

Referring to FIG. 1, an upright cylindrical pressure vessel 10 is closed at its lower end by a dish-shaped bottom 13. The upper end of the vessel is closed by a removable dome-shaped top 14. A vent pipe 18 in the top is normally closed by a valve 19. Steam separators 24 of this invention are mounted in a steam plenum chamber 25 just below steam dryer panels 26, and open at their lower ends into a core exit plenum 27 overlying a nuclear reactor core 28, which may be of conventional type. A feed water inlet plenum 29 underlies the reactor core and receives water under pressure from the discharge of a jet pump 30 located in a downcomer annulus 31 between the reactor core and the wall of the pressure vessel. Driving fluid, e.g., water, is supplied under pressure to the inlet of the jet pump by a driving fluid supply line 32 connected to the discharge of a recirculation pump 33. Water separated in the steam separtor 24 is supplied under pressure through a line 34 to a manifold 34A connected to the suction side of the recirculation pump. Since FIG. 1 is schematic, only one steam separator and jet pump are shown. However, in practice a number of each of these units is mounted in the pressure vessel.

Steam passing the dryers flows out of the pressure vessel through a steam supply line 35 into a turbine 36, and is returned through a condenser 37 and pump 38 to the downcomer annulus in the pressure vessel for recirculation.

Figure 2A:
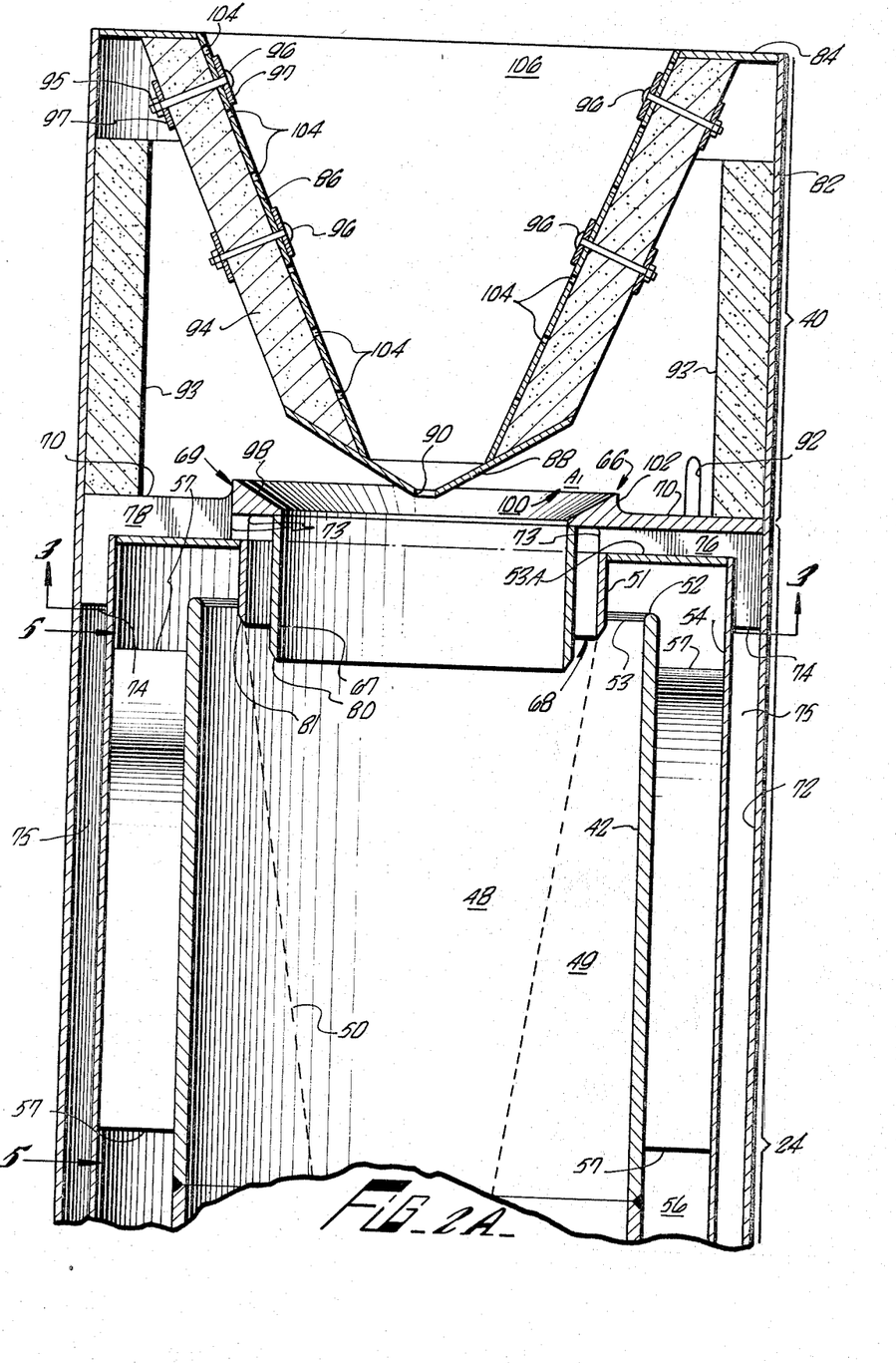
FIGS. 2A and 2B are fragmentary vertical cross-sectional views of the improved centrifugal steam separator and preliminary dryer of this invention.
Figure 2B:
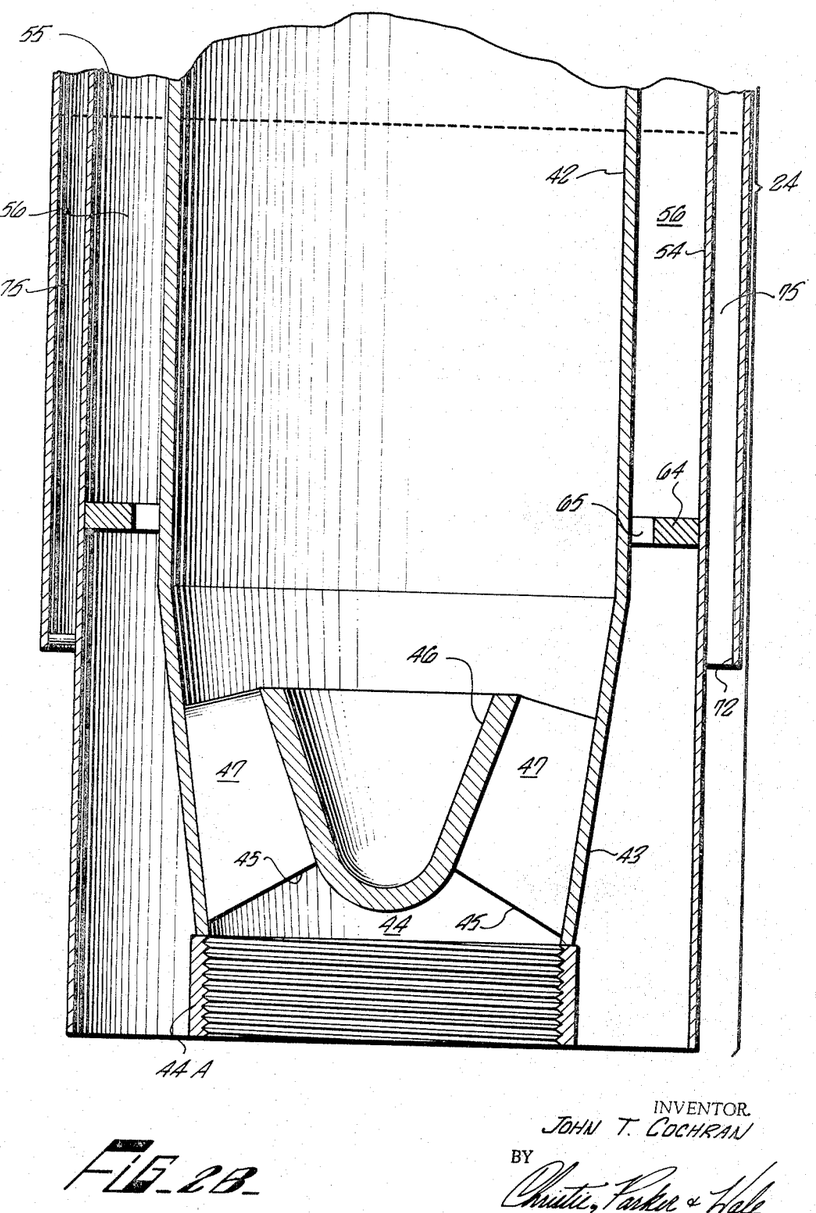

Referring to FIGS. 2A and 2B, a preliminary dryer section 40 is mounted on top of a steam separator 24. The separator includes a vertical vortex tube 42 having a downwardly and inwardly tapering inlet end 43 (FIG. 2B) secured to its lower end to form a vortex tube inlet opening 44. An internally threaded collar 44A secured to the lower end of the inlet end 43 is adapted to be screwed into conventional plumbing (not shown) which opens into the reactor core exit plenum. A plurality of entrance vanes 45 are supported between the interior walls of the inlet end 43 and a central hub 46 mounted coaxially within the inlet end. Passages 47 formed between adjacent vanes 45 serve as nozzles for the inlet of a mixture of steam and water from the reactor core exit plenum. The vanes 45 are curved and disposed to impart to the entering steam-water mixture a counterclockwise (as view from above) rotary motion which forms an inner steam vortex 48 surrounded by an annular outer water vortex 49. The shapes of the hub 46 and the vanes 45 are selected in relation to the surrounding structure to provide a cross-sectional area open to flow and measured at right angles to the flow directions between adjacent vanes that decreases with distance from inlet 44. In this region, therefore, the velocity of the entering steam-water mixture is substantially increased and a free vortex flow of water 49 is established in the vortex tube 42. In practice, it is preferable to produce a peripheral water velocity of about fifty-feet per second. Simultaneously, the accelerated steam-water mixture is given a counterclockwise (as viewed from above) rotary motion by the vanes 47 to form a steam vortex core surrounded by a water vortex. The approximate boundary between the steam vortex and the water vortex is indicated by dashed line 50 in FIG. 2A.

A first annular water removal means includes an inner tube 51 (FIG. 2A) spaced from and disposed concentrically a short distance into the upper or outlet end 52 of the vortex tube 42 to form an annular water vortex outlet 53. A first annular top plate 53A is secured to the upper end of the inner tube, which projects slightly above the upper end of the vortex tube. The first annular plate extends outwardly transverse to the longitudinal axis of the vortex tube, and a cylindrical first skirt 54, spaced from and disposed concentrically about the vortex tube, is secured at its upper end to the outer edge of the first top plate. The lower end of the skirt 54 terminates adjacent the vortex tube inlet well below the normal operating water level 55 indicated by the horizontal dashed line in the pressure vessel (FIG. 1).

Thus, there is formed a first annular liquid flow reversing outlet passage 56 around the upper end of the vortex tube by the inner tube 51, first annular plate 53A, and downwardly extending first skirt 54.

Figure 3:
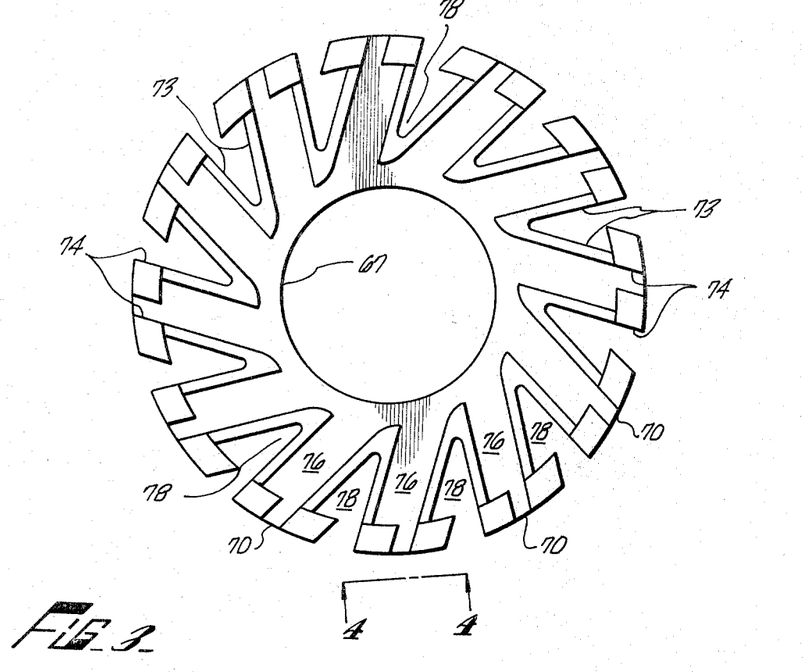
FIG. 3 is a transverse cross-sectional view taken on line 3—3 of FIG. 2A.
Figure 4:
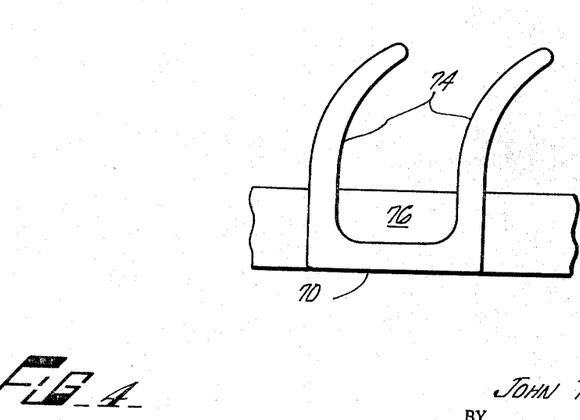
FIG. 4 is a view taken on line 4—4 of FIG. 3 showing the vanes for generating a vortex in the second annulus.

Inverted teardrop-shaped diffuser blades 57 are formed integrally with the exterior of the upper end of the vortex tube to be disposed in the upper portion of the first annular liquid flow reversing outlet passage 56. The diffuser blades are shown best in FIG. 5. The outer portion of each blade makes a close fit against the first skirt 54. In the particular embodiment shown in FIGS. 3 and 5, twelve diffuser blades are equally spaced at thirty degree intervals around the exterior of the vortex tube. Each blade extends downwardly and tangentially in a counterclockwise (as viewed from above) direction, and increases in thickness to a point about one-third the length of the blade from the upper end of the vortex tube. Thereafter, the blade tapers downwardly to a reduced thickness so that the entire body 58 of the blade has a generally inverted teardrop shape. The upper portion of each blade overlies a lower portion of an adjacent blade to form an inlet throat 60 which opens into a downwardly and outwardly diverging diffuser section 62 which performs the same function as a diffuser in a conventional jet pump, i.e., the velocity of the fluid flowing into the diffuser is decreased and converted to pressure.

Conveniently, the blades each have an inverted teardrop-shaped cavity 63 in the intermediate body portion to reduce weight and save material.

An annular flow-restriction ring 64 (FIG. 2B) is secured at its outer periphery to the first skirt 54 just above the lower end of the skirt. The internal diameter of the flow-restriction ring is greater than the external diameter of the vortex tube so that an annular orifice 65 is formed between the ring and the exterior of the vortex tube to provide back pressure for liquid discharge from the diffuser blades. The restriction helps the diffuser blades recover pressure by preventing separation of the fluid from the diverging walls of the diffuser passages.

Alternatively, the flow-restriction ring is omitted, and the lower end of the first annular passage 56 is connected to line 34 (shown only in FIG. 1) to supply water under pressure to the recirculation pump, and reduce power required to drive the pump.

A second annular or boundary layer water removal means 66 (FIG. 2A) is disposed coaxially around the first annular water removal means. The second such means includes a steam vortex outlet tube 67 which is disposed coaxially within inner tube 51 and extends from slightly above and below it. The steam vortex outlet tube is spaced inwardly from the inner tube 51 to form an annular boundary layer outlet 68. The location of the lower end of outlet tube 67 below or "upstream" from the lower or inlet edge 81 of tube 51 is particularly important because it prevents boundary layer spillage from flowing out with steam through steam vortex outlet tube 67. It also aids in removing excess separated water flow when the separator is operated at rates in excess of design capacities.

The upper end of the steam vortex outlet tube 67 is secured to the inner periphery of an annular ring 69 which is triangular in cross section and increases in thickness in an outward direction.

As shown best in FIGS. 2A, 2B, 3, and 4, twelve equally-spaced horizontal plates 70 extend outwardly from the outer periphery of the ring 69 and terminate against the interior of a second cylindrical outer skirt 72 which extends from a point well above the horizontal plate 70 to a point below flow-restriction ring 64 but above the lower end of the first or inner skirt 54. As shown best in FIG. 3, each plate leaves the ring 69 (FIG. 2A) at an angle disposed about fifteen degrees in a clockwise (as viewed from below) direction from radial.

A separate vertical plate 73 is secured to each side of each horizontal plate 70 and extends down to rest on the top of the annular plate 53A. A separate downwardly-extending vane 74 is formed integrally at the outer end of each vertical plate 73 to extend down into an annular space 75 between the inner skirt 54 and the outer skirt 72. Each vane is curved to impart a clockwise (as viewed from above) vortex to fluid entering the top of the annular space 75.

In effect, a second liquid flow reversing outlet passage is formed between the inner tube 51 and the steam vortex outlet tube 67, each channel 76 between the top of annular plate 53A, the vertical side plates 73, and a respective horizontal plate 70 to which they are secured, and annular space 75. The whirling motion imparted by vanes 74 to the liquid vapor mixture entering annulus 75 causes liquid to be slung against the interior of the outer skirt 72 so it drains out the lower end of annular space 75. Vapor, which is prevented from leaving the lower end of annular space 75 by the head of liquid imposed at level 55 reverses its flow and passes up through triangular-shaped (as viewed from above) vapor escape openings 78 between adjacent horizontal plates 70 to join steam or other vapor flowing upwardly through steam vortex outlet tube 67.

Thus, a mixture of liquid and vapor ascending the vortex tube in a counterclockwise direction enters the channels 76 formed between adjacent vertical plates 73 secured to a respective horizontal plate 70 to be directed into the annular space 75 between the inner and outer sleeves. Each pair of vanes 74 at the outer end of each horizontal plate 70 reverses the direction of the liquid-vapor mixture and forces it to spin in a clockwise direction in annular space 75 to effect separation of the liquid and vapor. The liquid flows out the lower end of annular space 75, and the vapor flows up annular space 75 and out openings 78 between adjacent horizontal plates 70. Thus, the surface of the liquid in the pressure tank is not disturbed by mixture of vapor and liquid impinging on it. This reduces a spattering and liquid carry-under.

As shown in FIG. 2A, and previously stated, the steam vortex outlet tube 67 extends below the lower or inlet end of inner tube 51, thus placing the inlet opening of steam vortex outlet tube 67 in steam-receiving relation with vortex tube 42 upstream from the inlet opening of the first annular water removal channel 53.

The lower ends 80 and 81 of the steam vortex outlet tube 67 and the inner tube 51 are each beveled downwardly and inwardly to provide a sharp annular knife edge to achieve better separation of steam and liquid.

Steam flowing up the steam vortex outlet tube 67 enters the preliminary dryer 40, which includes a cylindrical housing 82, which, if desired, may be an upward continuation of outer skirt 72. An annular dryer top plate 84 is secured at its outer periphery to the upper end of housing 82, and an inverted, perforated cone 86 is secured at its upper end to the inner periphery of the annular top plate 84. An imperforate bottom 88 of truncated conical shape having a central opening 90 is secured to the bottom of the perforated cone. The lower end of the dryer housing 82 has a plurality of openings 92 just above the horizontal plates 70. An annular body of fluid-permeable contact material 93 is disposed against the interior of housing 82 and rests at its lower end on the horizontal plates 70. A second or inner body 94 of fluid-permeable contact material in a hollow, truncated conical shape (apex downward) is secured by nuts 95, bolts 96, and washers 97 to the outer, or lower, surface of perforated inner cone 86.

The inner surface 98 of ring 69 forms the lower side of an annular entrance 100 to dryer 40 for the steam vortex. The other side of the entrance is formed by the lower surface of truncated cone 88 secured to the perforated inner cone. These surfaces diverge slightly in the outward direction, forming a passage with minimum cross-sectional area $A_1$ open to flow at least equal to the cross-section area of the steam vortex outlet tube 67. The cross-sectional area (perpendicular to the flow of steam)

of the annular entrance 100 increases with distance in direction of flow through the passage.

The outer or peripheral surface 102 of the ring 69 acts as a dam which prevents liquid from flowing inwardly over the top of steam vortex outlet tube 67 and reentering the steam stream entering the dryer.

The steam entering the dryer 40 from the steam vortex outlet tube 67 flows between the lower cone 88 and ring 69 into the region between the perforated cone 86 and drying mesh 93. Centrifugal force generated in the steam vortex causes entrained liquid droplets to be carried into the outer annular drying mesh 93. The extensive surface area of this mesh provides high-friction drag to the outer regions of the steam vortex, absorbs some of the kinetic energy of the steam vortex, reduces its rotary velocity, and causes a substantial portion of the entrained liquid droplets to coalesce and drop out of the steam stream. The coalesced liquid droplets accumulate on the mesh surfaces where the absence of a high-steam vortex velocity and gravity causes the liquid to drain downwardly onto the horizontal plates 70 and out openings 92, or else down annular discharge 75 between the inner and outer skirts.

The steam vortex, now at a rdeuced rotary velocity and containing a decreased moisture content, flows upwardly and inwardly through the conical mesh body 94 where the rotary velocity of the steam vortex is virtually destroyed. A further reduction of entrained moisture content is here effected by the same mechanism as just described with respect to outer mesh 93. The steam then passes through perforations 104 in the perforated cone and is ready for delivery to the overlying steam dryers shown in FIG. 1.

The total area of the perforations 104 in the inner cone 86 is at least equal to, and preferably greater than, the minimum area $A_1$ open to flow in the diverging annular passage 100 between ring 69 and lower cone 88. The moisture accumulating in the conical mesh 94 drains by gravity and drips off lower cone 88 into the lower pressure zone on the axis of the steam vortex in vortex tube 42. Here it acquires a rotary velocity if it is diverted from the longitudinal axis of the device, and is therefore centrifugally reseparated from the steam and returned to the water vortex. The effluent vapor from the primary dryer 40 is discharged through an oulet opening 106, which has an area at least equal to the total area of the perforations 104 in the perforated cone. The moisture content is about six percent by weight or less at the maximum flow rate.

The following examples illustrate the construction and performance of the separator-dryer device of the present invention.

EXAMPLE I

A steam separator embodying the principles of the present invention has the approximate dimensions shown in Table I following:

*Table I.—Improved separator of this invention*

| Item: | Dimension |
|---|---|
| Vortex tube 42: | |
|     Diameter ______inches__ | 8.50 |
|     Length ______do____ | 37.83 |
| Steam outlet tube 67: | |
|     Diameter ______inches__ | 5.50 |
|     Length ______do____ | 2.75 |
| Outer skirt 72: | |
|     Inside diameter ______inches__ | 12.38 |
|     Length ______do____ | 48.25 |
| Inner tube 51: | |
|     Diameter ______inches__ | 6.75 |
|     Length ______do____ | 1.63 |
| First top plate 53A: | |
|     Outside diameter ______inches__ | 11.75 |
| Skirt 54: | |
|     Length ______inches__ | 45.88 |

*Table I—Continued*

| Item: | Dimension |
|---|---|
| Inlet vanes 80: | |
|     Type ______ | Free vortex |
|     Number ______ | 8 |
|     Angles*: | |
|         Inlet end ______ | 90° |
|         Outlet end ______ | 27° |
| Diffuser blades 62: | |
|     Number ______ | 12 |
|     Angular spacing ______ | 30° |
|         Inlet angle* (inside edge) ______ | 16° |
|         Inlet angle* (outside edge) ______ | 19° |
|         Duffuser section angle ______ | 15° |
| Preliminary dryer 40: | |
|     Type ______ | Centrifugal |
|     Outer mesh 93: | |
|         Inside diameter ______inches__ | 11.00 |
|         Height ______do____ | 6.88 |
|         Thickness ______do____ | 1.00 |
|     Inner mesh 146: | |
|         Top ______inches__ | 11.50 |
|         Bottom ______do____ | 5.38 |
|         Thickness ______do____ | 1.00 |
| Vanes 74: | |
|     Type ______ | Free vortex |
|     Number ______pairs__ | 12 |
|     Radius of curvation (FIG. 4) ___inches__ | 1.50 |
| Channels 76 (FIG. 4): | |
|     Height ______inches__ | .50 |
|     Width ______do____ | 1.13 |

* Relative to horizontal.

EXAMPLE II

A typical dual cycle boiling water reactor was constructed and included a pressure vessel, an elevated steam drum, steam-water mixture risers opening from the pressure vessel into the steam drum where the mixture was separated in conventional commercial centrifugal separators. The steam was used to drive a steam turbine, the separated water was returned by pumping through a secondary steam generator back to the pressure vessel. The secondary steam was admitted to an intermediate stage in the turbine. There were 120 conventional steam separators in the steam drum spaced on a one-foot-square grid and they produced 2,560,000 lb./hr. of steam at nominal plant rating of 240 electrical megawatts, or 21,400 pounds of steam per hour per square foot for each separator. That was the maximum capacity for the conventional separators. Substitution of the separators of this invention markedly raised this limit. These separators have a maximum capacity of 62,000 pounds of steam per hour and occupy a slightly larger area—1.37 ft.$^2$. The corresponding separator capacitor for the same area steam drum is 45,200 pounds of steam per hour-foot$^2$ giving a total steam capacity of 5,430,000 lb./hr. at 1000 p.s.i. and 546° F. which is equivalent to 507 electrical megawatts. This increase is over one hundred percent more than the plant rating using conventional steam separators.

Figure 6:
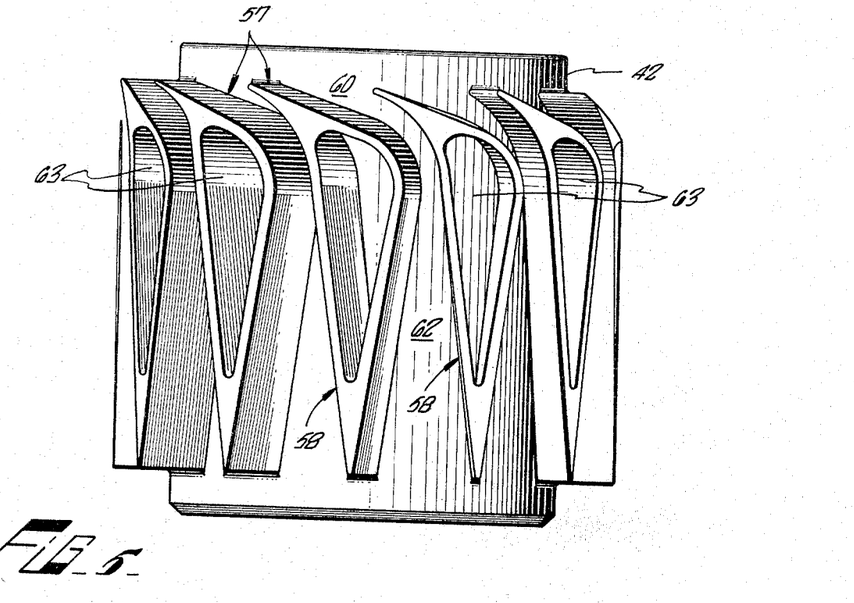
FIG. 6 is a graphic illustration of the improved performance of the vapor-liquid separator of this invention in steam service.

In FIG. 6, the weight percent entrained moisture in the effluent steam from the Example I steam separator-preliminary dryer of this invention is plotted against the ratio of the liquid discharge area (product of the circumference of the vortex tube 42 and the gap between the vortex tube 42 and the top plate 53A) to the inlet nozzle area (the net cross-sectional area for flow between vanes 47 at the inlet end of the vortex tube) at parameters of various inlet flow rates in pounds per hour. A critical effect on the moisture content of the effluent steam was found for ratios between about 0.9 and about 1.6. At each inlet flow rate, the effluent moisture decreased through a minimum value and then rose again as the ratios were varied through the ranges given.

I claim:
1. A vapor-liquid separator which comprises an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced from the outlet of said vortex tube and forming therebetween a first annular liquid flow reversing outlet passage to receive said liquid vortex and conduct it 180° around said outlet end, diffuser blades in the first liquid flow reversing outlet passage for reducing the velocity of the liquid and increasing its pressure, and a second annular liquid removal means surrounding and spaced from said first annular means and forming therebetween a second annular liquid flow reversing outlet passage to receive boundary layer liquid spillage from the entrance to said first annular passage and to conduct said spillage 180° axially around said first annular means, said second annular means having a central vapor vortex outlet opening communicating in vapor-receiving relation with said vortex tube.

2. A vapor-liquid separator which comprises an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced from the outlet of said vortex tube and forming therebetween an annular liquid flow reversing outlet passage to receive said liquid vortex and conduct it 180° around said outlet end, and diffuser blades in the liquid flow reversing outlet passage for reducing the velocity of the liquid and increase its pressure.

3. A vapor-liquid separator which comprises an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced from the outlet of said vortex tube and forming therebetween an annular liquid flow reversing outlet passage to receive said liquid vortex and conduct it 180° around said outlet end, and diffuser blades diverging in the direction of liquid flow in the liquid flow reversing outlet passage for reducing the velocity of the liquid and increase its pressure.

4. A vapor-liquid separator which comprises an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced from the outlet of said vortex tube and forming therebetween an annular liquid flow reversing outlet passage to receive said liquid vortex and conduct it 180° around said outlet end, diffuser blades in the liquid flow reversing outlet passage for reducing the velocity of the liquid and increase its pressure, and a back pressure flow means in the first annular liquid removal passage for increasing the pressure against which liquid discharges from the diffuser vanes and thereby prevent separation of the fluid stream from the walls of the diffusing passage.

5. A vapor-liquid separator system which comprises a pressure vessel for holding a pool of liquid, heat generating means in the pool of liquid for converting liquid into vapor, a recirculating pump having an outlet and an inlet arranged to circulate liquid through the vessel, an elongated vortex tube in the vessel and having a vapor-liquid mixture inlet opening at one end and an outlet opening at the other end, means connecting the inlet end of the vortex tube to receive a vapor-liquid mixture, means adjacent said inlet opening for imparting to a vapor-liquid mixture a rotary motion sufficient to establish within said vortex tube a vapor vortex surrounded by a liquid vortex, a first annular liquid removal means surrounding and spaced from the outlet of said vortex tube and forming therebetween an annular liquid flow reversing outlet passage to receive said liquid vortex and conduct it 180° around said outlet end, diffuser blades in the liquid flow reversing outlet passage for reducing the velocity of the liquid and increase its pressure, and means connecting the liquid flow reversing passage to the recirculating pump inlet so liquid flowing past the diffuser vanes is delivered of reduced velocity and increased pressure to the pump inlet.

6. A vapor-liquid separator which comprises an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced from the outlet of said vortex tube and forming therebetween a first annular liquid flow reversing outlet passage to receive said liquid vortex and conduct it 180° around said outlet end, diffuser blades in the first liquid flow reversing outlet passage for reducing the velocity of the liquid and increasing its pressure, a second annular liquid removal means surrounding and spaced from said first annular means and forming therebetween a second annular liquid flow reversing outlet passage to receive boundary layer liquid spillage from the entrance to said first annular passage and to conduct said spillage 180° axially around said first annular means, said second annular means having a central vapor vortex outlet opening communicating in vapor-receiving relation with said vortex tube, and means in the second annular flow reversing passage for imparting a spin to the material flowing through it.

7. A vapor-liquid separator which comprises an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced from the outlet of said vortex tube and forming therebetween a first annular liquid flow reversing outlet passage to receive said liquid vortex and conduct it 180° around said outlet end, diffuser blades in the first liquid flow reversing outlet passage for reducing the velocity of the liquid and increase its pressure, a second annular liquid removal means surrounding and spaced from said first annular means and forming therebetween a second annular liquid flow reversing outlet passage to receive boundary layer liquid spillage from the entrance to said first annular passage and to conduct said spillage 180° axially around said first annular means, said second annular means having a central vapor vortex outlet opening communicating in vapor-receiving relation with said vortex tube, and vanes in the second annular liquid reversing passage and arranged to impart spin to the spillage flowing through the second annular passage.

8. A vapor-liquid separator which comprises an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced from the outlet of said vortex tube and forming therebetween an annular liquid flow reversing outlet passage to receive said liquid vortex and conduct it 180° around said outlet end, means defining a plurality of radially arranged and spaced-apart channels extending transversely to the longitudinal axis of the vortex tube and over the edge of the outlet end of the tube, means on the inner ends of the channels connecting them to receive boundary layer, liquid spillage from the entrance to said annular passage, means on the outer ends of the channels to conduct said spillage in a direction opposite of flow through the vortex tube, and means defining a central vapor vortex outlet opening communicating in vapor-receiving relation with said vortex tube.

9. A vapor-liquid separator which comprises an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced from the outlet of said vortex tube and forming therebetween an annular liquid flow reversing outlet passage to receive said liquid vortex and conduct it 180° around said outlet end, diffuser blades in the liquid flow reversing outlet passage for reducing the velocity of the liquid and increase its pressure, means defining a plurality of radially arranged and spaced-apart channels extending transversely to the longitudinal axis of the vortex tube and over the edge of the outlet end of the tube, means on the inner ends of the channels connecting them to receive boundary layer liquid spillage from the entrance to said annular passage, means on the outer ends of the channels to conduct said spillage in a direction opposite of flow through the vortex tube, and means defining a central vapor vortex outlet opening communicating in vapor-receiving relation with said vortex tube.

10. A vapor-liquid separator mounted in a vessel containing a pool of liquid, the separator comprising an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, an annular liquid removal means surrounding and spaced from the outlet of said vortex tube and forming therebetween an annular liquid flow reversing outlet passage to receive said liquid vortex and conduct it 180° around said outlet end, means defining a plurality of radially arranged and spaced-apart channels extending transversely to the longitudinal axis of the vortex tube and over the edge of the outlet end of the tube, means on the inner ends of the channels connecting them to receive boundary layer liquid spillage from the entrance to said annular passage, means defining a discharge space opening below the surface of the pool of liquid, means on the outer ends of the channels to conduct said spillage in a direction opposite of flow through the vortex tube and into the discharge space, and means defining a central vapor vortex outlet opening communicating in vapor-receiving relation with said vortex tube.

11. A vapor-liquid separator which comprises an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, an annular liquid removal means surrounding and spaced from the outlet of said vortex tube and forming therebetween an annular liquid flow reversing outlet passage to receive said liquid vortex and conduct it 180° around said outlet end, means defining a plurality of radially arranged and spaced-apart channels extending transversely to the longitudinal axis of the vortex tube and over the edge of the outlet end of the tube, means on the inner ends of the channels connecting them to receive boundary layer liquid spillage from the entrance to said annular passage, vanes on the outer ends of the channels to conduct said spillage in a direction opposite of flow through the vortex tube and impart a rotary motion to fluid leaving the channels, and means defining a central vapor vortex outlet opening communicating in vapor-receiving relation with said vortex tube.

12. A vapor-liquid separator mounted in a vessel containing a pool of liquid, the separator comprising an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, an annular liquid removal means surrounding and spaced from the outlet of said vortex tube and forming therebetween an annular liquid flow reversing outlet passage to receive said liquid vortex and conduct it 180° around said outlet end, diffuser blades in the liquid flow reversing outlet passage to reduce the velocity of the liquid and increase its pressure, means defining a plurality of radially arranged and spaced-apart channels extending transversely to the longitudinal axis of the vortex tube and over the edge of the outlet end of the tube, means on the inner ends of the channels connecting them to receive boundary layer liquid spillage from the entrance to said annular passage, means defining a discharge space opening below the surface of the pool of liquid, and vanes on the outer ends of the channels to conduct said spillage into the discharge space in a direction opposite of flow through the vortex tube and impart a rotary motion to fluid leaving the channels, and means defining a central vapor vortex outlet opening communicating in vapor-receiving relation with said vortex tube.

13. A vapor-liquid separator which comprises an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced from the outlet of said vortex tube and forming therebetween a first annular liquid flow reversing outlet passage to receive said liquid vortex and conduct it 180° around said outlet end, diffuser blades in the first liquid flow reversing outlet passage to reduce the velocity of the liquid and increase its pressure, and a second annular liquid removal means surrounding and spaced from said first annular means and forming therebetween a second annular liquid flow reversing outlet passage to receive boundary layer liquid spillage from the entrance to said first annular passage and to conduct said spillage 180° axially around said first annular means, said second annular means having a central vapor vortex outlet opening communicating in vapor-receiving relation with said vortex tube in a region upstream from the inlet opening of said first annular liquid removal means.

14. A vapor-liquid separator which comprises an elongated vortex tube having a vapor-liquid mixture inlet opening at one end and an outlet opening at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced from the outlet of said vortex tube and forming therebetween a first annular liquid flow reversing outlet passage to receive said vortex and conduct it 180° around said outlet end, the inlet end of the first annular liquid removal means being shaped to present an annular knife edge to the flow of fluid past it, diffuser blades in the first liquid flow reversing outlet passage to reduce the velocity of the liquid and increase its pressure, and a second annular liquid removal means surrounding and spaced from said first annular means and forming therebetween a second annular liquid flow reversing outlet passage to receive boundary layer liquid spillage from the entrance to said first annular passage and to conduct said spillage 180° axially around said first annular means, the inlet end of the second annular liquid removal means being shaped to present an annular knife edge to the flow of fluid past it, and said second annular means having a central vapor vortex outlet opening communicating in vapor-receiving relation with said vortex tube.

15. A vapor-liquid separator and preliminary dryer which comprises an elongated vortex tube having a vapor-liquid mixture inlet opening axially at one end and an outlet opening axially at the other end, means adjacent said inlet opening for imparting to a vapor-liquid mixture a rotary motion sufficient to establish within said vortex tube a vapor vortex surrounded by a liquid vortex, a first annular liquid removal means surrounding and spaced apart from the outlet edge of said vortex tube and forming theerbetween a first annular liquid flow reversing outlet passage to receive said vortex and conduct it 180° axially around said outlet edge, a second annular liquid removal means surrounding and spaced apart from said first annular means and forming therebetween a second annular liquid flow reversing outlet passage to receive boundary layer liquid spillage from the entrance to said first annular means and to conduct said spillage 180° axially around said first annular means, said second annular means having a central vapor vortex outlet opening communicating in vapor receiving relation with said vortex tube upstream from the inlet opening of said first annular liquid removal means, a dryer housing having an upper dried vapor outlet opening, said housing being connected in vapor vortex receiving relation to said vapor vortex outlet opening, a cylindrical layer of fluid-permeable contact material disposed on the inner wall of said housing so as to preclude radial flow through said layer a conical layer of fluid-permeable contact material disposed apex downward within and spaced apart from said cylindrical layer and registering at its upper edge with the upper dried vapor outlet opening of said housing, an imperforate bottom having a central outlet opening on the longitudinal axis of said separator and secured to the lower base of said conical layer of fluid-permeable contact material, and a means within said dryer housing forming a dam around the vapor vortex outlet of said second annular liquid flow removal means, said dryer housing being provided with at least one opening adjacent its lower edge.

16. A dryer for removing residual quantities of entrained liquid from a vapor phase vortex which comprises a dryer housing having a vortex inlet opening centrally located at one end and a dried vapor outlet centrally located at the other end, a cylindrical layer of fluid-permeable contact material disposed in contact with the inner wall of said housing so as to preclude radial flow through said layer to provide frictional drag forces to reduce the vortex velocity, means for accumulating and conducting away from said cylindrical layer of fluid-permeable material liquid separated thereby, a truncated conical layer of fluid-permeable contact material disposed apex downward within and spaced apart from said cylindrical layer and registering at its upper edge with said conical layer, a perforated truncated conical support vapor outlet to provide for vortex flow through said member immediately surrounded by said conical layer, and an imperforate conical bottom having a central separated liquid outlet opening secured to the lower base of said conical support member.

References Cited

UNITED STATES PATENTS

| | | | |
|---|---|---|---|
| 2,187,646 | 1/1940 | Darrieus | 55—457 X |
| 2,569,909 | 10/1951 | Umney | 55—396 |
| 2,594,490 | 4/1952 | Patterson | 55—457 X |
| 3,154,140 | 10/1964 | Esselman et al. | 165—106 |
| 3,216,182 | 11/1965 | Cochran et al. | 55—337 X |
| 3,296,779 | 1/1967 | Daman et al. | 122—34 X |

ROBERT A. O'LEARY, *Primary Examiner.*

A. W. DAVIS, *Assistant Examiner.*

UNITED STATES PATENT OFFICE
CERTIFICATE OF CORRECTION

Patent No. 3,329,130                          July 4, 1967

John T. Cochran

It is hereby certified that error appears in the above numbered patent requiring correction and that the said Letters Patent should read as corrected below.

Column 2, line 67, after "is" insert -- a --; column 4, line 37, for "walls" read -- wall --; column 7, line 24, for "rdeuced" read -- reduced --; column 14, line 25, strike out "vapor outlet to provide for vortex flow through said" and insert the same after "with said" in line 23, same column 14.

Signed and sealed this 5th day of November 1968.

(SEAL)
Attest:

Edward M. Fletcher, Jr.                          EDWARD J. BRENNER Attesting Officer                                     Commissioner of Patents